(12) United States Patent
Kahlenberg et al.

(10) Patent No.: US 12,483,089 B2
(45) Date of Patent: Nov. 25, 2025

(54) ELECTRICAL MACHINE

(71) Applicant: Schaeffler Technologies AG & Co. KG, Herzogenaurach (DE)

(72) Inventors: Martin Kahlenberg, Aachen (DE); Ingo Schulz, Eschweiler (DE); Tim Ferebauer, Düren (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 319 days.

(21) Appl. No.: 18/035,323

(22) PCT Filed: Jul. 7, 2021

(86) PCT No.: PCT/DE2021/100589
§ 371 (c)(1),
(2) Date: May 4, 2023

(87) PCT Pub. No.: WO2022/096051
PCT Pub. Date: May 12, 2022

(65) Prior Publication Data
US 2024/0006957 A1 Jan. 4, 2024

(30) Foreign Application Priority Data
Nov. 6, 2020 (DE) .................. 102020129238.4

(51) Int. Cl.
*H02K 7/04* (2006.01)
*H02K 9/19* (2006.01)
(52) U.S. Cl.
CPC .................. *H02K 7/04* (2013.01); *H02K 9/19* (2013.01)
(58) Field of Classification Search
CPC ........ H02K 1/32; H02K 15/165; H02K 7/006; H02K 7/04; H02K 9/19
See application file for complete search history.

(56) References Cited

U.S. PATENT DOCUMENTS

| 4,600,848 A | 7/1986 | Sutrina et al. |
| 2014/0097712 A1* | 4/2014 | Kozaka ................. H02K 1/32 310/52 |
| 2021/0351664 A1* | 11/2021 | Jackson ................. H02K 7/006 |

FOREIGN PATENT DOCUMENTS

| DE | 102015014535 | 7/2016 |
| DE | 102018111993 | 11/2019 |

(Continued)

OTHER PUBLICATIONS

WO-2016132061-A1, all pages, (Year: 2016).*
DE-102019217510-A1, all pagesd (Year: 2021).*

*Primary Examiner* — Naishadh N Desai
(74) *Attorney, Agent, or Firm* — Volpe Koenig

(57) ABSTRACT

An electrical machine, in particular for use in a hybrid or fully electrical power train of a motor vehicle includes a stator and a rotor coaxially and rotatably arranged therein; a balancing disk for receiving and/or removing at least one balancing mass arranged on the rotor for conjoint rotation therewith, the balancing disk rotating in a radial plane of the rotor and being impinged by cooling fluid that is conducted radially outwards along at least one face under the effect of centrifugal force when the balancing disk rotates. On its face, the balancing disk includes a first fluid conducting element which runs radially more and more outwards in the axial direction out of the balancing disk such that the cooling fluid can be directed from the balancing disk toward the stator at an angle α relative to the radial plane when the balancing disk rotates.

17 Claims, 5 Drawing Sheets

(56) References Cited

FOREIGN PATENT DOCUMENTS

| DE | 102018222634 | 6/2020 | |
|----|----|----|----|
| DE | 102019202567 | 8/2020 | |
| DE | 102019217510 A1 * | 5/2021 | |
| EP | 2412083 | 4/2017 | |
| FR | 3033098 | 8/2016 | |
| JP | 2005006429 | 1/2005 | |
| JP | 2009273284 | 11/2009 | |
| WO | 2012069196 | 5/2012 | |
| WO | WO-2016132061 A1 * | 8/2016 | ............... H02K 1/32 |

* cited by examiner

ELECTRICAL MACHINE

CROSS-REFERENCE TO RELATED APPLICATIONS

This application is the U.S. National Phase of PCT Appln. No. PCT/EP2021/100589, filed Jul. 7, 2021, which claims priority from German Patent Application No. 10 2020 129 238.4, filed Nov. 6, 2020, the entire disclosures of which are incorporated by reference herein.

TECHNICAL FIELD

The present disclosure relates to an electrical machine, in particular for use in a hybrid or fully electrical drive train of a motor vehicle, comprising a stator and a rotor coaxially and rotatably arranged in the stator, wherein a balancing disk for receiving and/or removing at least one balancing mass is arranged in a non-rotatable manner on the rotor, said balancing disk rotating in a radial plane of the rotor and being able to be impinged by a cooling fluid in such a way that the cooling fluid is conducted radially outwards along at least one face under the effect of a centrifugal force when the balancing disk rotates.

BACKGROUND

It is generally known from the prior art to fully electrify drive trains of motor vehicles or to design them as a hybrid drive train in which electric motors are used together with an internal combustion engine to drive the motor vehicle. For example, a drive train of a hybrid vehicle comprises a combination of an internal combustion engine and an electric motor and enables—for example in urban areas—a purely electric mode of operation with both sufficient range and availability, in particular when driving overland. In addition, there is the possibility of driving the internal combustion engine and the electric motor at the same time in certain operating situations.

It is also known in principle from the prior art to eliminate imbalances in a high-speed component, such as the rotor of an electrical machine, by balancing the rotor. Balancing can be accomplished, for example, by removing material along the circumference of the rotating component in a targeted manner. For this purpose, so-called balancing disks made of metal are used, for example, as these enable a higher density of the removed volume as part of the, in particular, mechanical removal of material by drilling, grinding, milling or the like. Furthermore, the balancing disks can also alternatively or additionally receive additional balancing weights in order to possibly avoid material removal from the balancing disk if, for example, it is not possible to drill into the balancing disk for material removal due to structural conditions.

In particular, the balancing disks are stamped from a metal plate, milled, or manufactured using a metal casting process. From WO 2012/069196 A2 a balancing disk made of metal is known, which is supposed to reduce or compensate an unbalance of a rotating shaft.

In many applications, the high power density of electric motors in hybrid or fully electrical drive trains of motor vehicles makes it necessary to cool the electric motors. For example, the stator and/or the rotor of the electric motor can be cooled by a cooling circuit using oil. In such applications, the rotor shaft is generally designed as a hollow shaft through which a cooling oil can be fed to a balancing disk arranged on the rotor shaft. The rotor shaft as well as the balancing disk can be provided with radial channels through which the oil is directed radially outwards for cooling. Due to the rotational movement of the rotor shaft and the balancing disk, the cooling oil is conveyed radially outwards by centrifugal force. The oil then emerges from outlets at the radial end of the channels, thereby cooling the stator and rotor of the electrical machine.

SUMMARY

There is an ongoing need to optimize the cooling performance of such an oil cooling of a stator of an electrical machine effected by a balancing disk, in particular to cool the winding head of a stator particularly uniformly over its axial extension.

This object is achieved by an electrical machine, in particular for use in a hybrid or fully electrical drive train of a motor vehicle, comprising a stator and a rotor coaxially and rotatably arranged in the stator, wherein a balancing disk for receiving and/or removing at least one balancing mass is arranged in a non-rotatable manner on the rotor, said balancing disk rotating in a radial plane of the rotor and being able to be impinged by a cooling fluid in such a way that the cooling fluid is conducted radially outwards along at least one face under the effect of a centrifugal force when the balancing disk rotates, wherein on its face, the balancing disk includes at least a first fluid conducting element which runs radially more and more outwards in the axial direction out of the balancing disk such that the cooling fluid can be directed from the balancing disk in the direction of the stator at an angle $\alpha$ relative to the radial plane of the balancing disk when the balancing disk rotates.

This has the advantage that the cooling fluid can be directed outwards at several levels and thus, for example, the winding heads can be cooled at different levels. This also allows a significantly larger winding head surface to be oiled and more uniform cooling to be achieved.

The electrical machine according to the disclosure can in particular also be intended for use in a hybrid module. In a hybrid module, structural and functional elements of a hybridized drive train can be spatially and/or structurally combined and preconfigured so that a hybrid module can be integrated into a drive train of a motor vehicle in a particularly simple manner. In particular, an electric motor and a clutch system, in particular with a disconnect clutch for engaging the electric motor in and/or disengaging the electric motor from the drive train, can be present in a hybrid module.

A hybrid module can be divided into the following categories P0-P4 depending on the point of engagement of the electric motor in the drive train:

P0: the electric motor is arranged upstream of the internal combustion engine and is coupled to the internal combustion engine by means of a belt, for example. With this arrangement of the electric motor, it is also sometimes referred to as a belt-driven starter generator (BSG), P1: the electric motor is arranged directly behind the internal combustion engine. The electric motor can be arranged, for example, fixed to the crankshaft in front of the starting clutch, P2: the electric motor is arranged between a disconnect clutch, often referred to as K0, and the starting clutch but before the vehicle transmission in the drive train, P3: the electric motor is arranged in the vehicle transmission and/or transmission output shaft, P4: the electric motor is arranged on an existing or separate vehicle axle, and P5: the electric motor is arranged on or in the vehicle wheel, for example as a wheel hub motor.

The electrical machine according to the disclosure can in particular be intended for a P2 hybrid module.

First, the individual elements of the claimed subject matter disclosed herein are explained in the order in which they are named in the set of claims and particularly preferred embodiments of the subject matter of the disclosure are described below.

For the purposes of this application, motor vehicles are land vehicles that are moved by machine power without being restricted to railroad tracks. A motor vehicle can be selected, for example, from the group of passenger cars, trucks, small motorcycles, light motor vehicles, motorcycles, motor buses/coaches or tractors.

A hybrid electric vehicle (HEV) is an electric vehicle that is driven by at least one electric motor and another energy converter and draws energy from its electrical storage unit (battery) as well as from an additional fuel that it carries.

In the context of this application, the drive train of a motor vehicle is understood to mean all components that generate the power for driving the motor vehicle in the motor vehicle and transmit it to the road via the vehicle wheels.

Electrical machines are used to convert electrical energy into mechanical energy and/or vice versa, and generally comprise a stationary part referred to as a stator, stand, or armature, and a part referred to as a rotor or runner, and arranged to be movable relative to the stationary part. In the case of electrical machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

The electrical machine according to the disclosure is configured in particular as a radial flux machine.

The stator of a radial flux machine is usually constructed cylindrically and generally consists of electrical laminations that are electrically insulated from one another and are constructed in layers and packaged to form laminated cores. With this structure, the eddy currents in the stator caused by the stator field are kept low. Distributed over the circumference, grooves or peripherally closed recesses are embedded into the electrical lamination running parallel to the rotor shaft, and accommodate the stator winding or parts of the stator winding. Depending on the construction towards the surface, the grooves can be closed with closing elements such as closing wedges or covers or the like to prevent the stator winding from becoming detached.

According to an advantageous embodiment, the balancing disk can include, on its face, at least a second fluid conducting element which runs radially more and more outwards in the axial direction out of the balancing disk such that the cooling fluid can be directed from the balancing disk in the direction of the stator at an angle β relative to the radial plane of the balancing disk when the balancing disk rotates. A second fluid conducting element can be used to further adjust the conduction of the cooling fluid at the balancing disk, allowing for more precise control of the cooling fluid flow.

According to a further preferred development, the angle α and the angle β can be different from one another. The advantage of this embodiment is that the cooling fluid can be thrown in two different directions in a targeted manner, so that a more targeted cooling is possible at correspondingly defined regions of the stator.

Furthermore, according to an equally advantageous embodiment, a first group of fluid conducting elements and a second group of fluid conducting elements can be arranged in an alternating manner to one another in the circumferential direction, whereby the targeted control of the cooling fluid flow and the impinging of cooling fluid on the stator can be further improved.

According to a further particularly preferred embodiment, the first group of fluid conducting elements and/or the second group of fluid conducting elements can each be formed substantially identically. This also allows the control of the cooling fluid flow to be optimized in a simple manner from a manufacturing point of view.

In order to achieve a good distribution of the cooling fluid mist, the disclosure can also be further developed in that the first group of fluid conducting elements and/or the second group of fluid conducting elements are each arranged circumferentially equidistantly on the balancing disk.

In a likewise preferred embodiment variant, the balancing disk can have at least one first fluid conducting element on its first face and at least one second fluid conducting element on its second face, thereby creating an additional possibility for throwing the cooling fluid in the direction of the stator via the balancing disk in a targeted manner. In particular, utilizing the two faces of the balancing disk can also increase the capacity of the balancing disk with regard to generating a cooling fluid mist. In particular, the fluid conducting elements on the opposite faces can be configured to create a cooling fluid flow in different axial directions so that different axial regions of the stator can be impinged on by a cooling fluid.

It can also be advantageous to further develop the disclosure in that at least one of the fluid conducting elements is designed to be ramp-shaped or channel-shaped. Preferably, all fluid conducting elements of a group are designed to be ramp-shaped or channel-shaped. The expression "channel-shaped" refers to a closed channel-shape as well as open channel-shape in this application.

According to a further preferred embodiment of the subject matter of the disclosure, the balancing disk can have, on its circumferential lateral surface, radially inwardly pointing openings which are configured in such a way that an unbalance of the rotor is compensated. This, in particular, provides the advantage that balancing of the rotor is made possible, wherein the removal of material or the addition of balancing masses does not negatively affect the defined and directed fluid flow and bearing stress occurring with axial openings is avoided.

Finally, the disclosure can also be advantageously designed such that the balancing disk is arranged on a rotor shaft which has fluid channels extending radially outwardly, which are configured in such a way that the cooling fluid is conducted from the rotor shaft to one of the faces provided with a fluid conducting element, wherein the fluid channels are arranged equidistantly over the circumference of the rotor shaft and the balancing disk has inlet openings arranged centrally in the circumferential direction with respect to a fluid conducting element, which inlet openings are together hydraulically connected via an annular channel to the fluid channels of the rotor shaft.

In a further preferred embodiment, the stator can have a winding head which projects in the axial direction from a laminated stator core of the stator, wherein at least the first fluid conducting element is configured in such a way that the cooling fluid can be directed by the balancing disk in the direction of the winding head when the balancing disk rotates, so that the winding head can be cooled in a targeted and controlled manner.

BRIEF DESCRIPTION OF THE DRAWINGS

The disclosure will be explained in more detail below with reference to figures without limiting the general concept of the disclosure.
In the Figures.

DETAILED DESCRIPTION

Figure 1:
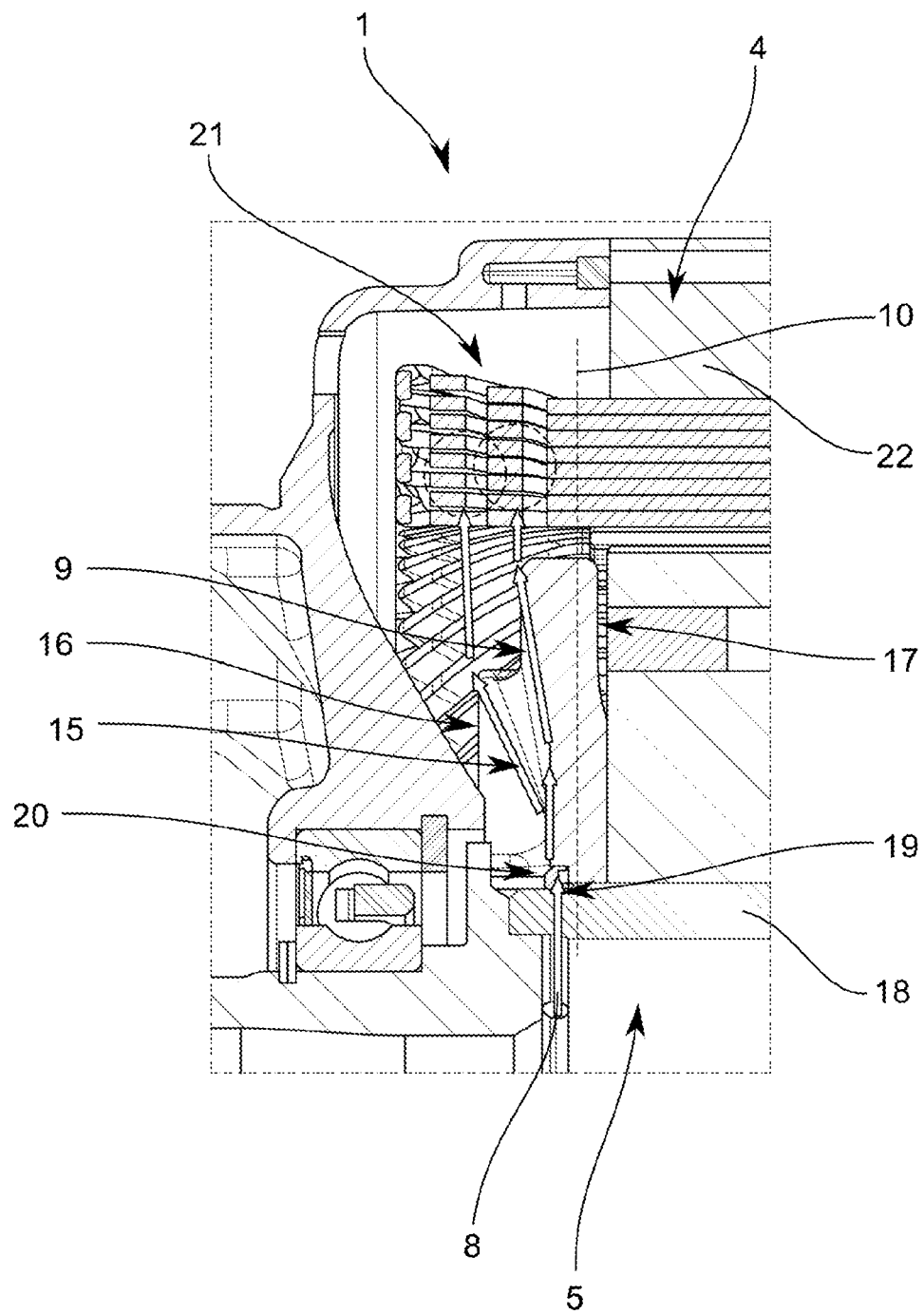
FIG. 1 shows an axial sectional view of an electrical machine.
Figure 5:
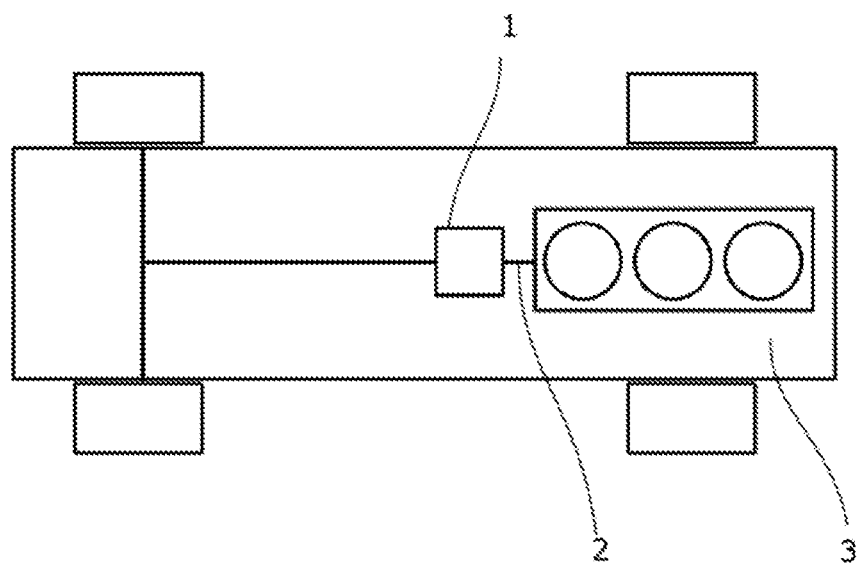
FIG. 5 shows a motor vehicle with an electrical machine.
Figure 5:
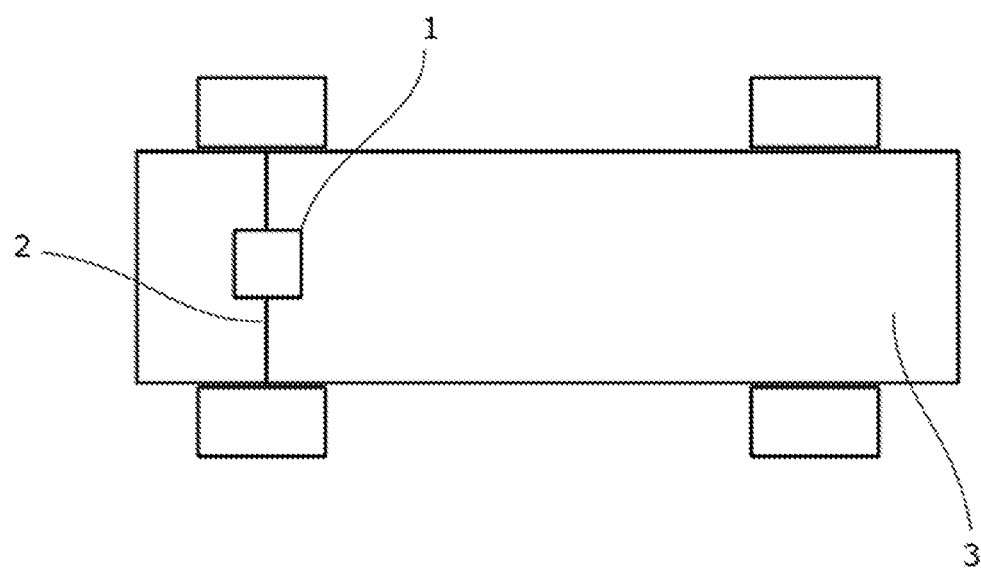

FIG. 1 shows an electrical machine 1, in particular for use in a hybrid or fully electrical drive train 2 of a motor vehicle 3, as shown by way of example in FIG. 5.

The electrical machine 1 has a cylindrical ring-shaped stator 4 and a rotor 5 coaxially and rotatably arranged in the stator 4, wherein a balancing disk 6 for receiving or removing at least one balancing mass 7 is arranged in a non-rotatable manner on the rotor 5, said balancing disk rotating in a radial plane 10 of the rotor 5.

The balancing disk 6 is able to be impinged by a cooling fluid 8 in such a way that the cooling fluid 8 is conducted radially outwards along the face 16 under the effect of a centrifugal force when the balancing disk rotates, as indicated by the arrows in FIG. 1. On its face 16, the balancing disk 6 includes a first fluid conducting element 9 which runs radially more and more outwards in the axial direction out of the balancing disk 6 such that the cooling fluid 8 can be directed from the balancing disk in the direction of the stator 4 at an angle α relative to the radial plane 10 of the balancing disk 6 when the balancing disk 6 rotates. FIG. 1 further shows that, on its face, the balancing disk 6 further includes a second fluid conducting element 15 which runs radially more and more outwards in the axial direction out of the balancing disk 6 such that the cooling fluid 8 can be directed from the balancing disk in the direction of the stator 4 at an angle β relative to the radial plane 10 of the balancing disk 6 when the balancing disk 6 rotates. The angle α and the angle β are different from one another, so that different regions of the stator 4 and/or the winding head 21 can be impinged by the cooling fluid 8, which is indicated by the dashed circles in FIG. 1.

In the embodiment of the electrical machine 1 shown, the stator 4 has a winding head 21 which projects in the axial direction from a laminated stator core 22 of the stator 4, wherein the first and second fluid conducting elements 9,15 are configured in such a way that the cooling fluid 8 can be directed by the balancing disk 6 in the direction of the winding head 4 when the balancing disk rotates.

Figure 3:
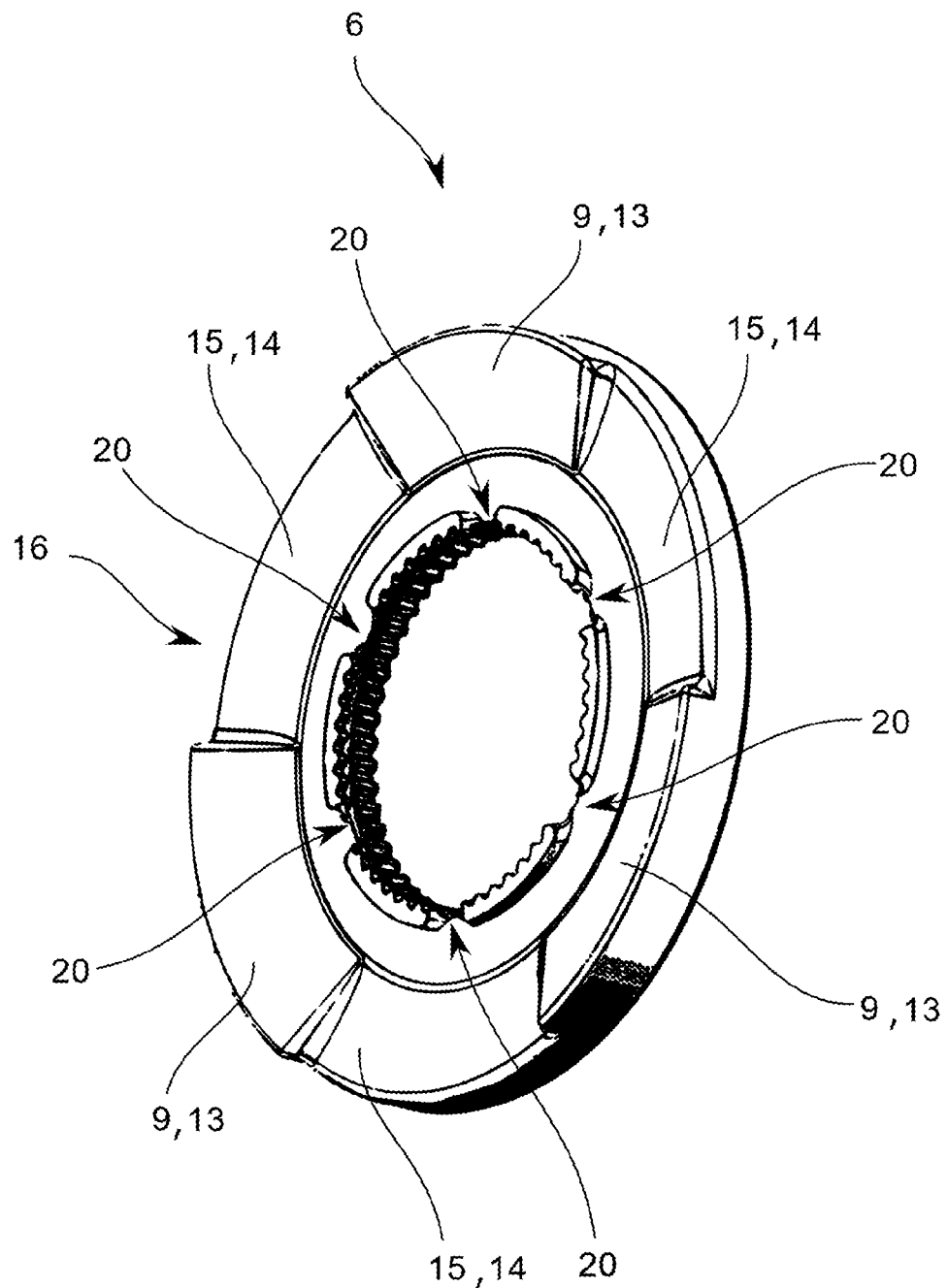
FIG. 3 shows a balancing disk in a perspective view.

As can be seen particularly well in FIG. 3, a first group 13 of fluid conducting elements 9 and a second group 14 of fluid conducting elements 15 are arranged in an alternating manner to one another in the circumferential direction. The first group 13 of fluid conducting elements 9 and the second group 14 of fluid conducting elements 15 are each formed substantially identically, i.e., the fluid conducting elements 9,15 of a group are formed substantially identically. The first group 13 of fluid conducting elements 9 and the second group 14 of fluid conducting elements 15 are each arranged circumferentially equidistantly on the balancing disk 6.

In the embodiment shown, the fluid conducting elements 9,15 are designed to be ramp-shaped.

Figure 4:
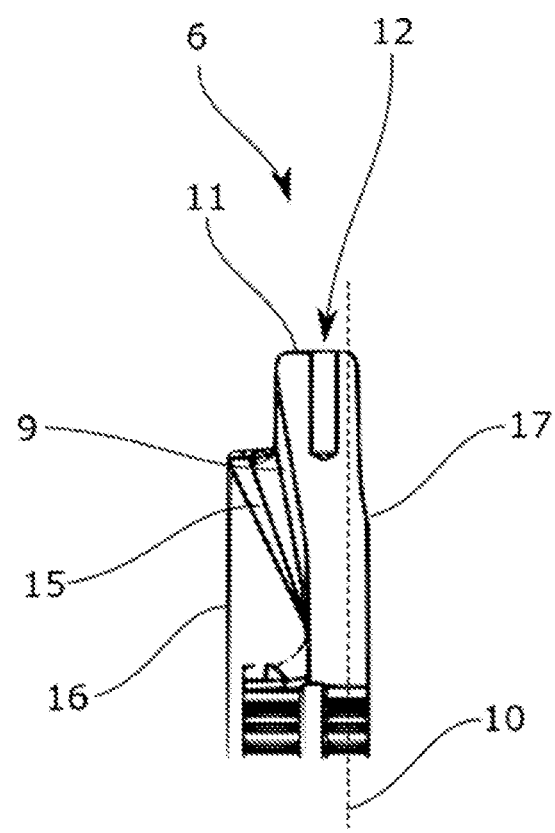
FIG. 4 shows a cross-sectional view of a balancing disk.

It can be seen in FIG. 4 that the balancing disk 6 has, on its circumferential lateral surface 11, radially inwardly pointing openings 12 which are configured in such a way that an unbalance of the rotor 5 is compensated. Due to the radially extending openings 12, the outward oil flow via the fluid conducting elements 9,15 is, on the one hand, not disturbed and, on the other hand, the bearing stress due to centrifugal force within the balancing disk 6 is reduced.

Figure 2:
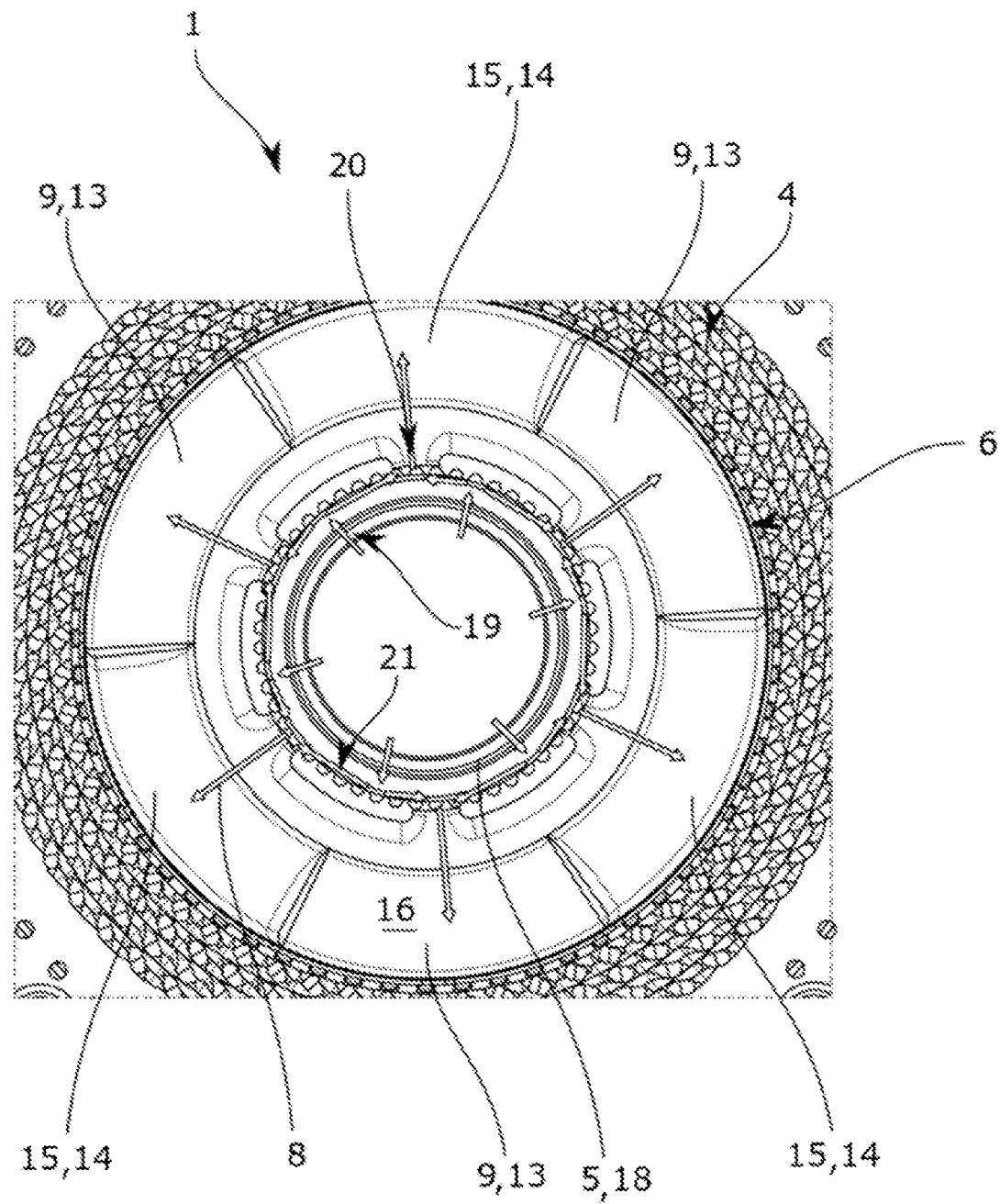
FIG. 2 shows a top view of an electrical machine.

FIG. 2 shows that the balancing disk 6 is arranged on a rotor shaft 18 which has fluid channels 19 extending radially outwardly, which are configured in such a way that the cooling fluid 8 is conducted from the rotor shaft 18 to one of the faces 16,17 provided with a fluid conducting element 9,15. The cooling fluid flow is indicated by the arrows in FIG. 2. The fluid channels 19 are arranged equidistantly over the circumference of the rotor shaft 18 and the balancing disk 6 has inlet openings 20 arranged centrally in the circumferential direction with respect to a fluid conducting element 9,15, which inlet openings are together hydraulically connected via an annular channel 21 to the fluid channels 19 of the rotor shaft 18. This design ensures that a constant proportion of cooling fluid 8 is always fed to the fluid conducting elements 9,15, irrespective of the mounting position of the balancing disk 6 relative to the rotor shaft 18.

In the exemplary embodiment shown in FIG. 2, the balancing disk 6 is designed with a spline that is pushed onto the rotor shaft 18, which is designed as a hollow shaft. It can be seen—as already explained above—that the orientation in which the balancing disk 6 is fitted onto the rotor shaft 18 has no effect on the amount of cooling fluid supplied to the fluid conducting elements 9,15, since the cooling fluid flow balances out at each radial inlet opening 20 of the balancing disk 6. The prerequisite for this is that the number of radial fluid channels 19 in the rotor shaft 18 is equal to the number of inlet openings 20 in the balancing disk 6. Also—as shown—both the fluid channels 19 and the inlet openings 20 must be evenly distributed around the circumference.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Electrical machine
2 Drive train
3 Motor vehicle
4 Stator
5 Rotor
6 Balancing disk
7 Balancing mass
8 Cooling fluid
9 Fluid conducting element
10 Radial plane
11 Lateral surface
12 Openings 13 Group of fluid conducting elements
14 Group of fluid conducting elements
15 Fluid conducting element
16 Face
17 Face
18 Rotor shaft
19 Fluid channels
20 Inlet openings
21 Annular channel
22 Laminated stator core

The invention claimed is:

1. An electrical machine comprising:
a stator;
a rotor coaxially and rotatably arranged in the stator;
a balancing disk arranged in a non-rotatable manner on the rotor, said balancing disk rotating in a radial plane of the rotor and being impingeable by a cooling fluid such that the cooling fluid is conducted radially outwards along at least one face of the balancing disk via a centrifugal force when the balancing disk rotates; and
the balancing disk includes on the at least one face:
a first group of first fluid conducting elements which run radially more and more outwards in an axial direction out of the balancing disk such that the cooling fluid is directable from the balancing disk in a direction of the stator at an angle α relative to the radial plane of the balancing disk when the balancing disk rotates; and
a second group of second fluid conducting elements which run radially more and more outwards in the axial direction out of the balancing disk such that the cooling fluid is directable from the balancing disk in the direction of the stator at an angle β relative to the radial plane of the balancing disk when the balancing disk rotates;
wherein the first group of the first fluid conducting elements and the second group of the second fluid conducting elements are arranged in an alternating manner to one another in a circumferential direction.

2. The electrical machine according to claim 1, wherein the angle α and the angle β are different from one another.

3. The electrical machine according to claim 1, wherein at least one of the first group of the first fluid conducting elements or the second group of the second fluid conducting elements is each formed substantially identically.

4. The electrical machine according to claim 1, wherein at least one of the first group of the first fluid conducting elements or the second group of the second fluid conducting elements are each arranged circumferentially equidistantly on the balancing disk.

5. The electrical machine according to claim 1, wherein the balancing disk has at least one said first fluid conducting element on a first of the at least one face and at least one said second fluid conducting element on a second of the at least one face.

6. The electrical machine according to claim 1, wherein at least one of the fluid conducting elements is ramp-shaped or channel-shaped.

7. The electrical machine according to claim 1, wherein the balancing disk has, on a circumferential lateral surface thereof, radially inwardly pointing openings which are configured to compensate an unbalance of the rotor.

8. An electrical machine comprising:
a stator;
a rotor coaxially and rotatably arranged in the stator;
a balancing disk arranged in a non-rotatable manner on the rotor, said balancing disk rotating in a radial plane of the rotor and being impingeable by a cooling fluid such that the cooling fluid is conducted radially outwards along at least one face of the balancing disk via a centrifugal force when the balancing disk rotates; and
the balancing disk includes on the at least one face, at least a first fluid conducting element which runs radially more and more outwards in an axial direction out of the balancing disk such that the cooling fluid is directable from the balancing disk in a direction of the stator at an angle α relative to the radial plane of the balancing disk when the balancing disk rotates;
wherein the balancing disk is arranged on a rotor shaft which has fluid channels extending radially outwardly, which are configured such that the cooling fluid is conducted from the rotor shaft to the at least one face provided with the fluid conducting element, and the fluid channels are arranged equidistantly over a circumference of the rotor shaft and the balancing disk has inlet openings arranged centrally in a circumferential direction with respect to the fluid conducting element, and the inlet openings are together hydraulically connected via an annular channel to the fluid channels of the rotor shaft.

9. The electrical machine according to claim 1, wherein the stator has a winding head which projects in the axial direction from a laminated stator core of the stator, and at least the first fluid conducting element is configured such that the cooling fluid is directable by the balancing disk in a direction of the winding head when the balancing disk rotates.

10. An electrical machine, comprising:
a stator;
a rotor coaxially and rotatably arranged in the stator;
a balancing disk arranged in a non-rotatable manner on the rotor, said balancing disk rotating in a radial plane of the rotor and being impingeable by a cooling fluid such that the cooling fluid is conducted radially outwards along a first face of the balancing disk via a centrifugal force when the balancing disk rotates; and
a first fluid conducting element which extends further axially from the radial plane of the balancing disk as the first fluid conducting element extends radially outwardly to define a first angle relative to the radial plane;
wherein the balancing disk has, on a circumferential lateral surface thereof, radially inwardly pointing openings which are configured to compensate an unbalance of the rotor, the radially inwardly pointing openings extending only through the circumferential lateral surface.

11. The electrical machine according to claim 10, further comprising a second fluid conducting element which extends further axially from the radial plane of the balancing disk as the second fluid conducting element extends radially outwardly to define a second angle relative to the radial plane.

12. The electrical machine according to claim 11, wherein the first angle and the second angle are different from one another.

13. The electrical machine according to claim 12, wherein there are a plurality of the first fluid conducting elements and a plurality of the second fluid conducting elements are arranged in an alternating manner to one another in a circumferential direction on the first face.

14. The electrical machine according to claim 13, wherein at least one of: a) the plurality of the first fluid conducting elements are each formed identically or b) the plurality of the second fluid conducting elements are each formed substantially identically.

15. The electrical machine according to claim 13, wherein at least one of a) the plurality of the first fluid conducting elements are each arranged circumferentially equidistantly on the balancing disk or b) the plurality of the second fluid conducting elements are each arranged circumferentially equidistantly on the balancing disk.

16. The electrical machine according to claim 11, wherein the balancing disk has a second face and the first fluid conducting element is located on the first face and the second fluid conducting element is located on the second face.

17. The electrical machine according to claim 11, wherein at least one of the first or the second fluid conducting element is ramp-shaped or channel-shaped.

* * * * *